(12) United States Patent
Park et al.

(10) Patent No.: US 7,948,568 B2
(45) Date of Patent: May 24, 2011

(54) DISPLAY SUBSTRATE AND METHOD FOR REPAIRING A DEFECTIVE PIXEL OF THE DISPLAY SUBSTRATE

(75) Inventors: Jae-Hyun Park, Cheonan-si (KR); Kyung-Wook Kim, Seoul (KR); Sung-Hwan Bae, Asan-si (KR)

(73) Assignee: Samsung Electronics Co., Ltd. (KR)

( * ) Notice: Subject to any disclaimer, the term of this patent is extended or adjusted under 35 U.S.C. 154(b) by 469 days.

(21) Appl. No.: 12/119,118

(22) Filed: May 12, 2008

(65) Prior Publication Data
US 2009/0115925 A1 May 7, 2009

(30) Foreign Application Priority Data

Nov. 6, 2007 (KR) ........................ 10-2007-0112756

(51) Int. Cl.
*G02F 1/136* (2006.01)
(52) U.S. Cl. ............ 349/41; 349/48; 349/144; 349/192; 349/139; 349/38

(58) Field of Classification Search ................ 349/41, 349/48, 144, 139, 38, 43
See application file for complete search history.

(56) References Cited

U.S. PATENT DOCUMENTS

| | | | | |
|---|---|---|---|---|
| 7,760,311 B2 * | 7/2010 | Chung et al. | ................... | 349/144 |
| 7,773,185 B2 * | 8/2010 | Bae et al. | ....................... | 349/144 |

* cited by examiner

*Primary Examiner* — Thoi V Duong
(74) *Attorney, Agent, or Firm* — Cantor Colburn LLP

(57) ABSTRACT

A display substrate includes a pixel electrode including a main electrode and a sub-electrode disposed apart from the main electrode and including an opening part. The display substrate includes a first switching device and a second switching device. The first switching device is connected to the main electrode. An extension electrode extends from the second switching device and overlaps the opening part. The extension electrode is connected to the sub-electrode via a contact part. According to the present invention, after a defective pixel is repaired, the repaired pixel operates normally.

10 Claims, 6 Drawing Sheets

DISPLAY SUBSTRATE AND METHOD FOR REPAIRING A DEFECTIVE PIXEL OF THE DISPLAY SUBSTRATE

This application claims priority to Korean Patent Application No. 2007-112756, filed on Nov. 6, 2007, and all the benefits accruing therefrom under 35 U.S.C. §119, the contents of which in its entirety are herein incorporated by reference.

BACKGROUND OF THE INVENTION

1. Field of the Invention

The present invention relates to a display substrate and, more particularly, to a display substrate and a method of repairing a defective pixel of the display substrate.

2. Description of the Related Art

Generally, a liquid crystal display ("LCD") device includes an array substrate, an opposite substrate facing the array substrate and an LCD panel having a liquid crystal layer interposed between the array substrate and the opposite substrate. The array substrate includes a plurality of gate lines and a plurality of data lines which intersect the gate lines. A plurality of pixels is disposed on the array substrate including the plurality of gate lines and the plurality of data lines. A switching device, such as a thin film transistor ("thin film transistor"), is connected to each of a gate line of the plurality of gate lines and a data line of the plurality of data lines. A pixel electrode is formed on each pixel of the plurality of pixels, and is connected to the switching device.

A manufacturing process of the array substrate includes a photolithography process, for example. During the photolithography process, various pixel defects occur. For example, short circuits and/or open circuits are created between respective gate lines and/or data lines. More specifically, a short circuit defect between a storage common line and a data line or a short circuit defect between the storage common line and a gate line occur during the manufacturing process of the array substrate.

When a pixel defect such as mentioned above occurs, a defective pixel having the pixel defect is cut off from the array substrate using a laser. Specifically, the switching device applying a voltage to the pixel electrode is disconnected, and the pixel electrode is thereby shorted to the storage common electrode, and a storage common voltage is thereafter applied to the pixel electrode. As a result, the repaired, e.g., cut off, pixel continuously displays a black color (in a normally black mode LCD device). Thus, when the repaired pixel is, for example, a green pixel, the repaired green pixel is easily perceived. As a result, an image display quality of the LCD device including the repaired green pixel deteriorates.

BRIEF SUMMARY OF THE INVENTION

An exemplary embodiment of the present invention provides a display substrate in which a defective pixel is easily repaired.

An alternative exemplary embodiment of the present invention provides a method for repairing a defective pixel of a display substrate.

In accordance with an exemplary embodiment of the present invention, there is provided a display substrate including a pixel electrode, a first switching device, a second switching device and an extension electrode. The pixel electrode includes a main electrode and a sub-electrode disposed separate from the main electrode. The sub-electrode has an opening part. The first switching device includes a first gate terminal, a first input terminal, and a first output terminal. The first gate terminal is connected to an n-th gate line (wherein n is a natural number) and the first input terminal is connected to a data line. The first output terminal is connected to the main electrode. The second switching device includes a second gate terminal, a second input terminal, and a second output terminal. The second gate terminal is connected to the n-th gate line and the second input terminal is connected to the data line. The extension electrode extends from the second output terminal of the second switching device and overlaps the opening part of the sub-electrode. The extension electrode is connected to the sub-electrode via a contact part.

In an alternative exemplary embodiment of the present invention, the extension electrode may overlap the sub-electrode, and the contact part may be formed at an end portion of the extension electrode.

In another exemplary embodiment of the present invention, the display substrate may further include a third switching device. The third switching device includes a third gate terminal, a third input terminal, and a third output terminal. The third gate terminal is connected to an (n+1)-th gate line and the third input terminal is connected to the sub-electrode. The third output terminal is connected to the first output terminal of the first switching device.

The display substrate may further comprise an up-capacitor connected to the first output terminal of the first switching device. The main electrode and the third output terminal of the third switching device may overlap to form the up-capacitor.

The display substrate may further comprise a storage line, formed by overlapping the main electrode and the sub-electrode.

In another alternative exemplary embodiment, the storage line may overlap edge portions of each of the main electrode and the sub-electrode.

The display substrate may further comprise a down-capacitor connected to the third output terminal of the third switching device. The storage line and the third output terminal of the third switching device may overlap to form the down-capacitor.

In another exemplary embodiment of the present invention, the first and second switching devices include at least one common input terminal.

In yet another exemplary embodiment of the present invention, the sub-electrode may have a trapezoidal shape having a base side and an upper side opposite to the base side, each substantially parallel to a first direction in which the n-th gate line is disposed. The main electrode may be disposed adjacent to oblique sides which connect the base side and the upper side of the sub-electrode.

In accordance with an exemplary embodiment of the present invention, there is provided a method for repairing a defective pixel of a display substrate. Here, the display substrate includes a main electrode, a sub-electrode disposed apart from the main electrode and comprising an opening part, a first switching device having a first output terminal connected to the main electrode through a first contact part, a second switching device having a second output terminal, an extension electrode which extends from the second output terminal of the second switching device and is connected to the sub-electrode through a second contact part to electrically connect the second switching device to the sub electrode, and a third switching device having a third input terminal connected to the sub-electrode through a third contact part and being connected to the second switching device.

The method for repairing the defective pixel of the display substrate includes disconnecting the second switching device from the sub-electrode by cutting the extension electrode at a location disposed between the second output terminal of the second switching device and the second contact part, and disconnecting the third switching device from the sub-electrode by cutting a portion of the third input terminal of the third switching device.

In an alternative exemplary embodiment of the present invention, the second contact part may be formed at an end portion of the extension electrode. The extension electrode may be exposed through the opening part of the sub-electrode, and the disconnecting the third switching device from the sub-electrode comprises cutting a portion of the extension electrode exposed through the opening part.

In an exemplary embodiment of the present invention, the disconnected portion of the extension electrode and a portion of the sub-electrode overlapping the connected portion of the extension electrode forms a coupling capacitor.

In another alternative exemplary embodiment of the present invention, the disconnecting the third switching device from the sub-electrode comprises disconnecting a connection line between the third input terminal and the third contact part.

In another alternative exemplary embodiment of the present invention, the third switching device further has a third output terminal that overlaps the main electrode to from an up-capacitor, and the third switching device is electrically coupled to the first switching device via the up-capacitor. The method for repairing the defective pixel may further include disconnecting the third switching device from the first switching device by cutting the third output terminal at a location disposed between the third output terminal and the up-capacitor.

In an exemplary embodiment of the present invention, the method may be performed when an electrical short occurs between the third output terminal and the main electrode. In another alternative exemplary embodiment of the present invention, the method may be performed when a defect of the third switching device occurs.

In accordance with another exemplary embodiment of the present invention, there is provided a display substrate including a pixel electrode, a first switching device, a second switching device, an extension electrode and a third switching device. The pixel electrode includes a main electrode and a sub-electrode disposed apart from the main electrode and including an opening part. The first switching device has a first output terminal being connected to the main electrode. The second switching device has a second output terminal. The extension electrode extends from the second output terminal and overlaps the opening part. The extension electrode is connected to the sub-electrode via a contact part. The third switching device is connected to the sub-electrode and the first output terminal.

According to a display substrate and a method for repairing a defective pixel thereof in accordance with exemplary embodiments of the present invention, after a defective pixel is repaired, the repaired pixel operates normally.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1:
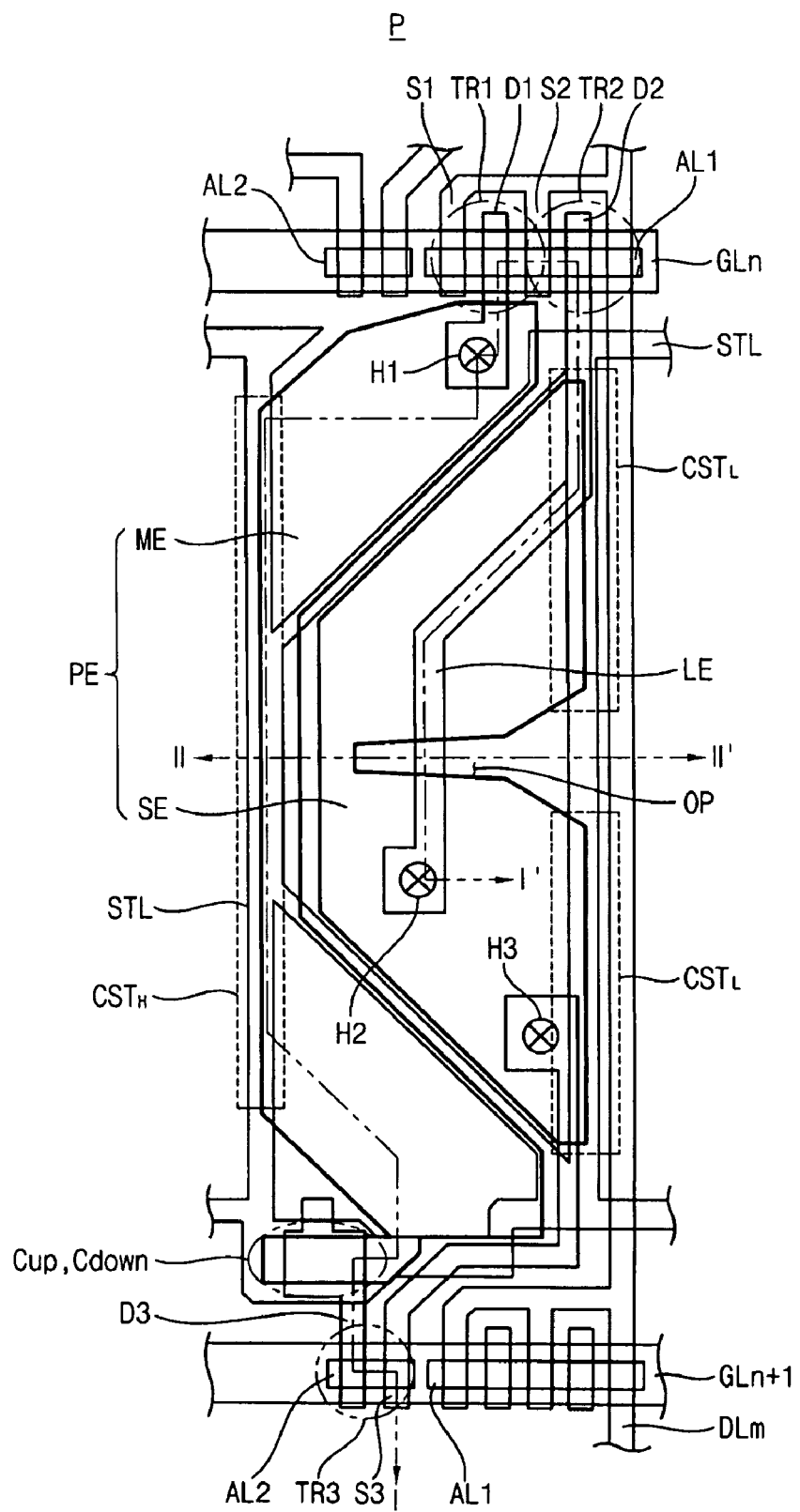
FIG. 1 is a plan view of a display substrate according to an exemplary embodiment of the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the present invention will be described in further detail with reference to the accompanying drawings.

Figure 2A:
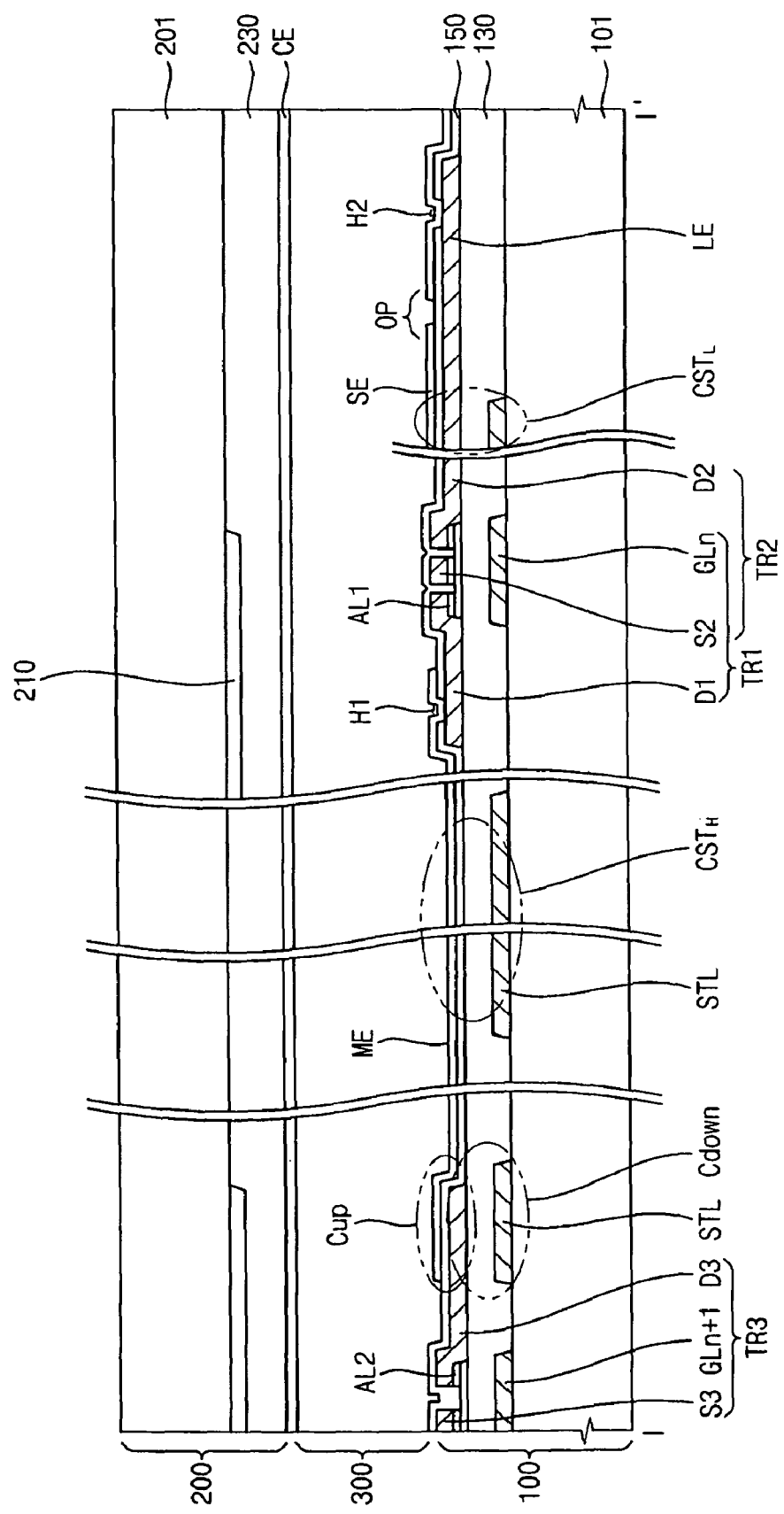
FIG. 2A is a partial cross-sectional view taken along line I-I' in FIG. 1.
Figure 2B:
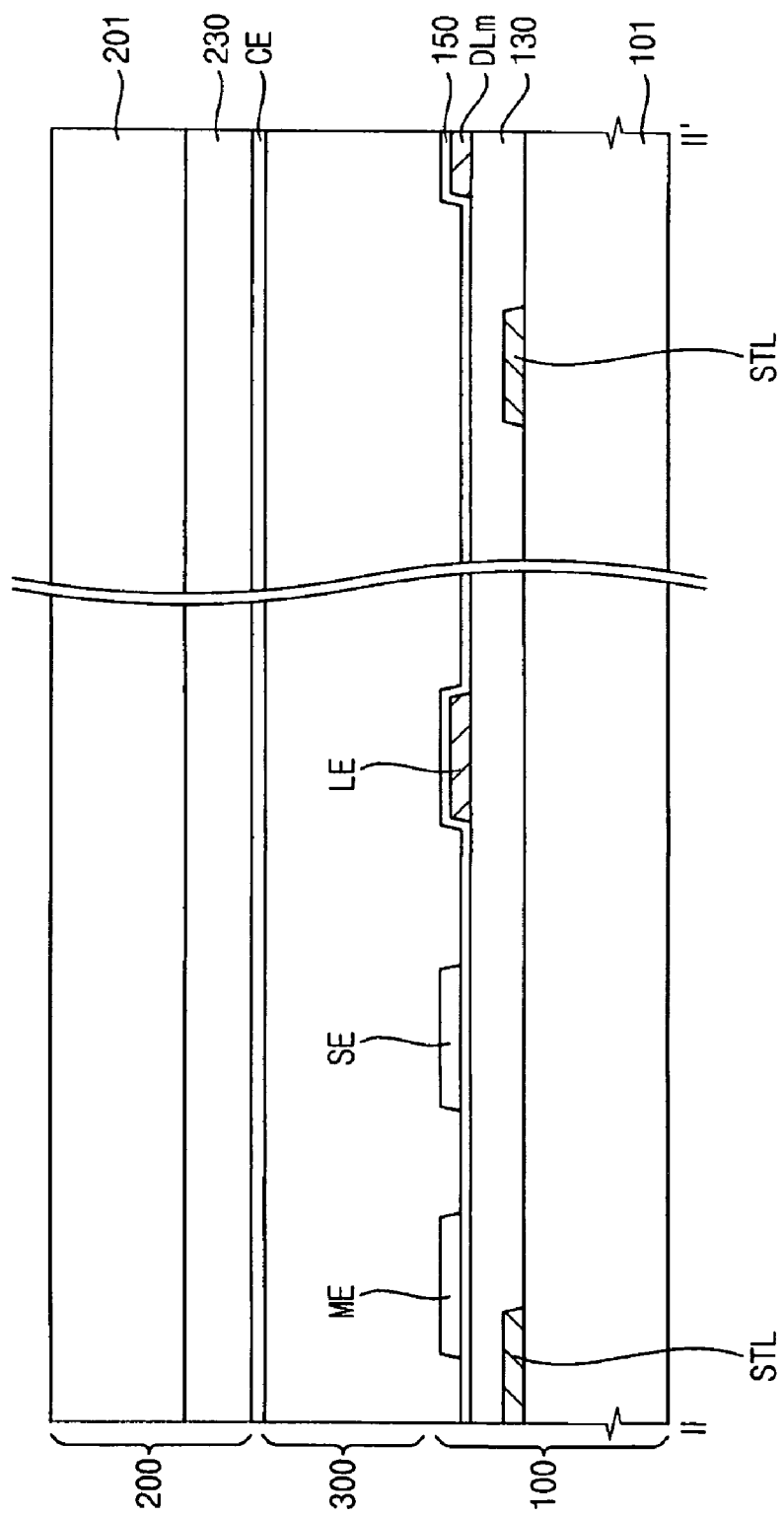
FIG. 2B is a partial cross-sectional view taken along line II'-II' in FIG. 1.

FIG. 1 is a plan view of a display substrate according to an exemplary embodiment of the present invention. FIG. 2A is a partial cross-sectional view taken along line I-I' in FIG. 1. FIG. 2B is a partial cross-sectional view taken along line I'-I' in FIG. 1.

Referring to FIGS. 1, 2A and 2B, a display panel includes a display substrate 100, an opposite substrate 200 and a liquid crystal layer 300.

The display substrate 100 includes a first base substrate 101 including a plurality of pixel regions P, a plurality of gate lines GL extending in a first direction, and a plurality of data lines DL extending in a second direction substantially opposite to the first direction and intersecting the plurality of gate lines GL. In an exemplary embodiment, "n" and "m" are natural numbers. Note that only a gate line GLn, a gate line GLn+1, and a data line DLm are shown in FIG. 1.

A pixel electrode PE including a main electrode ME and a sub-electrode SE is formed in the pixel region P of the first base substrate 101. A first portion of the pixel region P corresponding to the main electrode ME is defined as a main pixel region, and a second different portion of the pixel region corresponding to the sub-electrode SE is defined as a sub pixel region. Put another way, the pixel region P is divided into the main pixel region and the sub pixel region.

In an exemplary embodiment, the pixel region P has a substantially rectilinear shape. In addition, the sub-electrode SE may be formed in a trapezoidal shape having a base and an upper line substantially parallel with the gate line GLn and the gate line GLn+1.

The sub-electrode SE is formed in the pixel region P, and more specifically, in the sub pixel region of the pixel region P. The sub-electrode SE includes an opening part OP formed to include a predetermined length in the first direction, as shown in FIG. 1. In an exemplary embodiment, the opening part OP is formed by patterning the sub-electrode SE. In addition, the main electrode ME is disposed adjacent to oblique sides, e.g., sides not aligned in the first direction or the second direction, of the trapezoid-shaped sub-electrode SE.

A storage line STL, a first switching device TR1, a second switching device TR2 and a third switching device TR3 are further formed in the pixel region P.

The gate line GLn and the gate line GLn+1 extend in the first direction, and the data line DLm extends in the second direction. In an exemplary embodiment, the data line DLm is substantially parallel to the base line and the upper line of the sub-electrode SE having the substantially trapezoidal shape.

The storage line STL overlaps edge portions of both the main electrode ME and the sub-electrode SE. In an exemplary embodiment, the storage line STL includes a first region overlapping an edge of the main electrode ME, a second region overlapping an edge of the sub-electrode SE, and a third region overlapping an output terminal of the third switching device TR3.

Further, the first region of the storage line STL and the main electrode ME define a first storage capacitor $CST_H$, while the second region of the storage line STL and the sub-electrode SE define a second storage capacitor $CST_L$. The third region of the storage line STL and an end portion of a third drain electrode D3 which corresponds to the output terminal of the third switching device TR3 define a down-capacitor Cdown. Further, the end portion of the third drain electrode D3 and the main electrode ME which overlaps the end portion of the third drain electrode D3 define an up-capacitor Cup.

The storage line STL overlaps edges of the main electrode ME and the sub-electrode SE. More specifically, the storage line STL is formed in a separation region between the main electrode ME and the sub-electrode SE, e.g., in a separation region formed between the data line DLm and the main electrode ME, and in a separation region formed between the data line DLm and the sub-electrode SE. Therefore, the storage line STL blocks light which leaks through the separation regions.

Input terminals of the first switching device TR1 are connected to the gate line GLn, e.g., an n-th gate line GLn, and the data line DLm, e.g., an m-th data line DLm. Herein, "n" and "m" are natural numbers. Output terminals of the first switching device TR1 are connected to the main electrode ME. Specifically, the first switching device TR1 includes a first gate electrode (not illustrated) electrically connected to the n-th gate line GLn, a first source electrode S1 connected to the m-th data line DLm, and a first drain electrode D1 electrically connected to the main electrode ME via a first contact part H1. In an exemplary embodiment, as illustrated in FIG. 1, an additional first gate electrode is not formed, but the gate line GLn itself may function as the first gate electrode.

A first active layer AL1 may be formed between the n-th gate line GLn and the first source/drain electrodes S1 and D1.

Input terminals of the second switching device TR2 are connected to the n-th gate line GLn and the m-th data line DLm, as well. Further, output terminals of the second switching device TR2 are connected to the sub-electrode SE. More specifically, the second switching device TR2 includes a second gate electrode (not illustrated) electrically connected to the n-th gate line GLn, a second source electrode S2 connected to the m-th data line DLm, and a second drain electrode D2 electrically connected to the sub-electrode SE.

Thus, in an exemplary embodiment, the first switching device TR1 and the second switching device TR2 have a dual structure including common input terminals. For example, as illustrated in FIG. 1, an additional second gate electrode is not formed, but the gate line GLn itself may function as the second gate electrode. Alternatively, a gate electrode of the second switching devices TR2 is also a gate electrode of the first switching devices TR1, or a source electrode of the second switching device TR2 may be the same as a source electrode of the first switching device TR1.

The second drain electrode D2 includes an extension electrode LE which overlaps the sub-electrode SE. The extension electrode LE extends from the second drain electrode D2 to intersect the opening part OP of the sub-electrode SE, as shown in FIG. 1. A second contact part H2 is formed on an end portion of the extension electrode LE, e.g., an end portion opposite the second drain electrode D2 of the extension electrode LE. Thus, the extension electrode LE is connected to the sub-electrode SE via the second contact part H2.

Input terminals of the third switching device TR3 are connected to the (n+1)-th gate line GLn+1 and the sub-electrode SE. In addition, an output terminal of the third switching device TR3 is connected to the output terminal of the first switching device TR1. More specifically, the third switching device TR3 includes a third gate electrode (not illustrated) electrically connected to the (n+1)-th gate line GLn+1, a third source electrode S3 electrically connected to the sub electrode SE via a third contact part H3, and a third drain electrode D3 overlapping the main electrode ME. An area of the third drain electrode D3 which overlaps the main electrode ME defines the up-capacitor Cup, as shown in FIG. 1.

A second active layer AL2 may be formed between the (n+1)-th gate line GLn+1 and the third source/drain electrodes S3 and D3.

A gate insulation layer 130 and a passivation layer 150 are formed on the first base substrate 101 (see FIGS. 2A and 2B). Specifically, the gate insulation layer 130 is formed on the first base substrate 101 on which a gate metal pattern (not shown) is formed. In an exemplary embodiment, the gate metal pattern includes the first gate electrode, the second gate electrode, the third gate electrode, the storage line STL, and the gate lines GLn and GLn+1. Further, the passivation layer 150 is formed on a source metal pattern (not shown) including the first source electrode S1, the second source electrode S2, the third source electrode S3, the first drain electrode D1, the second drain electrode D2, the third drain electrode D3, and the data line DLm. In addition, the passivation layer 150 includes the first contact part H1, the second contact part H2, and the third contact part H3.

Still referring to FIGS. 2A and 2B, the opposite substrate 200 is combined with the display substrate 100 to receive the liquid crystal layer 300 therebetween. The opposite substrate 200 includes a second base substrate 201 on which the plurality of pixel regions P are defined. The opposite substrate 200 includes a shading pattern 210, a color filter layer 230 and a common electrode CE, which are each formed on the second base substrate 201. More specifically, the shading pattern 210 is formed in regions corresponding to the plurality of gate lines GL and the plurality of data lines DL. The color filter layer 230 includes a plurality of color filters (not shown) formed in the plurality of pixel regions P. In an exemplary embodiment, the color filters include a red color filter, a green color filter, and a blue color filter, for example, but alternative exemplary embodiments are not limited thereto.

The common electrode CE is formed on the color filter layer 230. In an exemplary embodiment, the common electrode layer CE has an opening (not shown) patterned to divide the pixel region P into a plurality of domains. In an alternative exemplary embodiment, a protrusion (not shown) including an organic material may be formed corresponding to the pixel region P to divide the pixel region P into a plurality of domains.

The common electrode CE, the main electrode ME and the liquid crystal layer 300 form a first liquid crystal capacitor $CLC_H$ (see FIG. 3) in the main pixel region. Likewise, the common electrode CE, the sub-electrode SE and the liquid crystal layer 300 form a second liquid crystal capacitor $CLC_L$ (FIG. 3) in the sub pixel region.

A pixel according to an exemplary embodiment of the present invention as described above may be utilized as a red pixel in which a red color filter is formed, a green pixel in which a green color filter is formed, and a blue pixel in which a blue color filter is formed, for example, but alternative exemplary embodiments are not limited thereto. Further, the above-described pixel may be the green pixel having a brightness greater than a brightness of each of the red pixel and the blue pixel. Thus, when a defect occurs in the green pixel, the green pixel works normally after a repair process, described in greater detail below with reference to FIGS. 3-5, and thus deterioration of the brightness of the green pixel, for example, is substantially reduced and/or effectively prevented.

Figure 3:
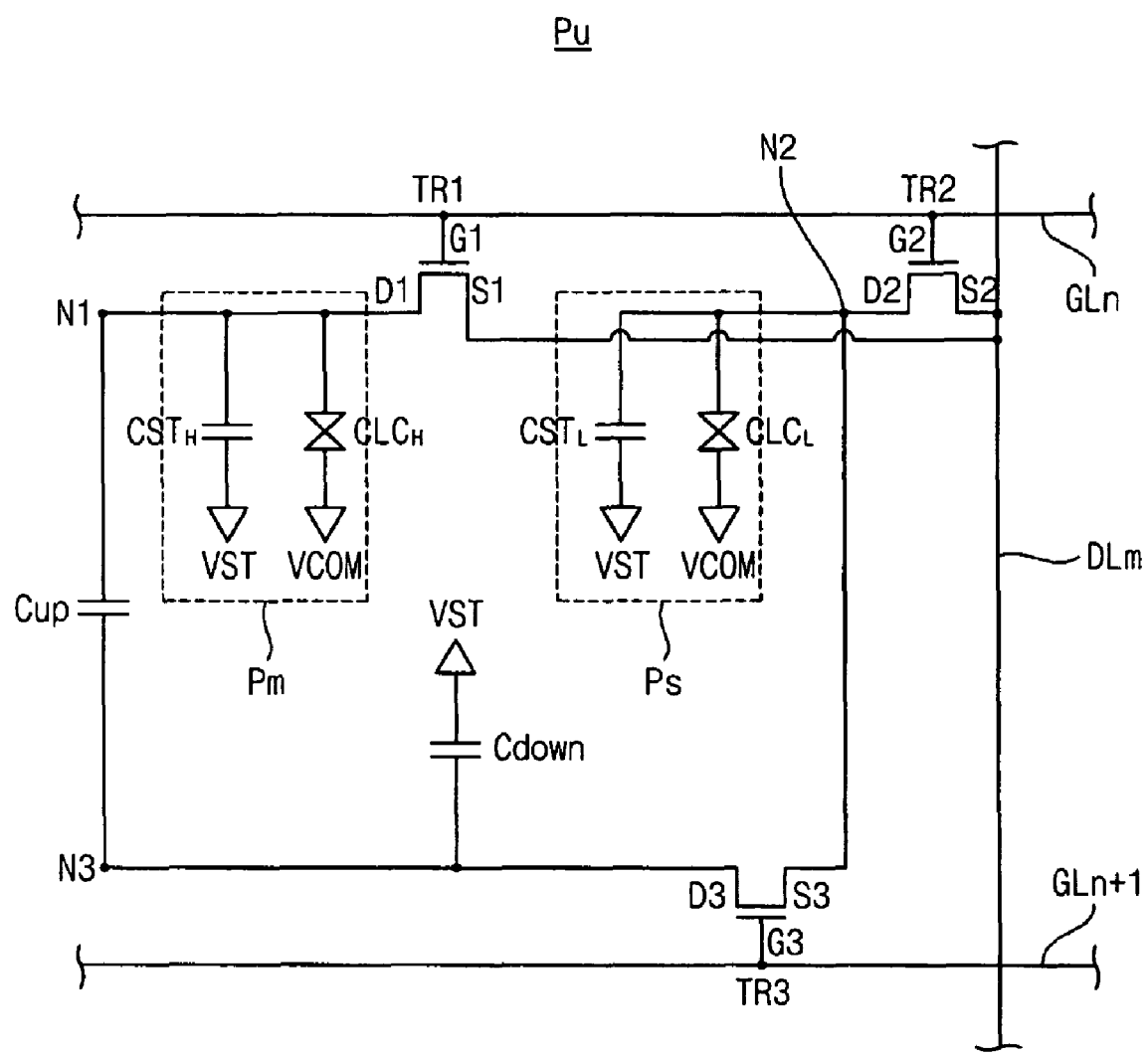
FIG. 3 is an equivalent schematic circuit diagram of a unit pixel of the display substrate according to the exemplary embodiment of the present invention in FIG. 1.

FIG. 3 is an equivalent schematic circuit diagram of a unit pixel of the display substrate according to the exemplary embodiment of the present invention in FIG. 1.

Referring to FIGS. 1 and 3, a unit pixel Pu includes a main pixel Pm and a sub pixel Ps. The unit pixel Pu further includes a driving part (not illustrated) which drives the main pixel Pm and the sub pixel Ps.

The main pixel Pm includes a first liquid crystal capacitor $CLC_H$ and a first storage capacitor $CST_H$. The sub pixel Ps includes a second liquid crystal capacitor $CLC_L$ and a second storage capacitor $CST_L$. The driving part (not shown) includes a first switching device TR1, a second switching device TR2, a third switching device TR3, a down-capacitor Cdown and an up-capacitor Cup (see FIGS. 1 and 2A).

Still referring to FIGS. 1 and 3, a first gate electrode G1 of the first switching device TR1 is connected to an n-th gate line GLn, and a first source electrode S1 of the first switching device TR1 is connected to an m-th data line DLm. A first drain electrode D1 of the first switching device TR1 is connected to a first terminal of the first liquid crystal capacitor $CLC_H$ at a first node N1. A first terminal of the first storage capacitor $CST_H$ is connected to the first terminal of the first liquid crystal capacitor $CLC_H$ at the first node N1. A first common voltage VCOM is applied to a second terminal of the first liquid crystal capacitor $CLC_H$, and a second common voltage VST is applied to a second terminal of the first storage capacitor $CST_H$.

A second gate electrode G2 of the second switching device TR2 is connected to the n-th gate line GLn, and a second source electrode S2 of the second switching device TR2 is connected to the m-th data line DLm. A second drain electrode D2 of the second switching device TR2 is connected to a first terminal of the second liquid crystal capacitor $CLC_L$ at a second node N2. A first terminal of the second storage capacitor $CST_L$ is connected to the first terminal of the second liquid crystal capacitor $CLC_L$ at the second node N2. The first common voltage VCOM is applied to a second terminal of the second liquid crystal capacitor $CLC_L$, and the second common voltage VST is applied to a second terminal of the second storage capacitor $CST_L$.

A third gate electrode G3 of the third switching device TR3 is connected to an (n+1)-th gate line GLn+1, and a third source electrode S3 of the third switching device TR3 is connected to the second drain electrode D2 of the second switching device TR2 at the second node N2. A third drain electrode D3 of the third switching device TR3 is connected to a first terminal of the up-capacitor Cup at a third node N3. A second terminal of the up-capacitor Cup is connected to the first drain electrode D1 of the first switching device TR1 at the first node N1. A first terminal of the down-capacitor Cdown is connected to the third drain electrode D3 at the third node N3, and a second terminal of the down-capacitor Cdown is connected to the second common voltage VST.

A driving method for driving the unit pixel Pu will now be described in further detail with reference to FIG. 3.

When a gate signal is applied to the n-th gate line GLn, the first switching device TR1 and the second switching device TR2 are each turned on, and a data voltage (for example, approximately 5 volts, but alternative exemplary embodiments are not limited thereto) is thereby transmitted from the m-th data line DLm and is applied to the first liquid crystal capacitor $CLC_H$ and the first storage capacitor $CST_H$. Accordingly, the data voltage is charged into the first liquid crystal capacitor $CLC_H$ and the first storage capacitor $CST_H$. In an exemplary embodiment, the first common voltage VCOM and the second common voltage VST are each approximately zero volts, e.g., a ground voltage, but alternative exemplary embodiments are not limited thereto.

The up-capacitor Cup connected to the first drain electrode D1 of the first switching device TR1 at the first node N1 is charged by a voltage difference between the first node N1 and the third node N3. At the same time, the down-capacitor Cdown is charged by a voltage difference between the third node N3 and the second common voltage VST.

When a gate signal is applied to the (n+1)-th gate line GLn+1, the third switching device TR3 is turned on. Accordingly, a voltage (e.g., approximately 5 V) at the second drain electrode D2 (e.g., at the second node N2) is applied to the first terminal of the up-capacitor Cup at the third node N3 through the third switching device TR3.

When the voltage at the second node N2 (e.g., approximately 5 v) is applied to the first terminal of the up-capacitor Cup, a voltage at the second terminal of the up-capacitor Cup at the first node N1 is boosted, since the voltage charged in the up-capacitor Cup is fixed. Accordingly, voltages at the first terminal of the first liquid crystal capacitor $CLC_H$ and the first terminal of the first storage capacitor $CST_H$ are also boosted. Therefore, each of the first liquid crystal capacitor $CLC_H$ and the first storage capacitor $CST_H$ is charged by a data voltage greater than the data voltage charged in the second liquid crystal capacitor $CLC_L$ and the second storage capacitor $CST_L$. The voltage charged in the down-capacitor Cdown is dropped through the second terminal of the down-capacitor Cdown to which the second common voltage (0 V) is applied.

As a result, the data voltage charged in the main pixel Pm is greater than the data voltage charged in the sub pixel Ps.

Figure 4:
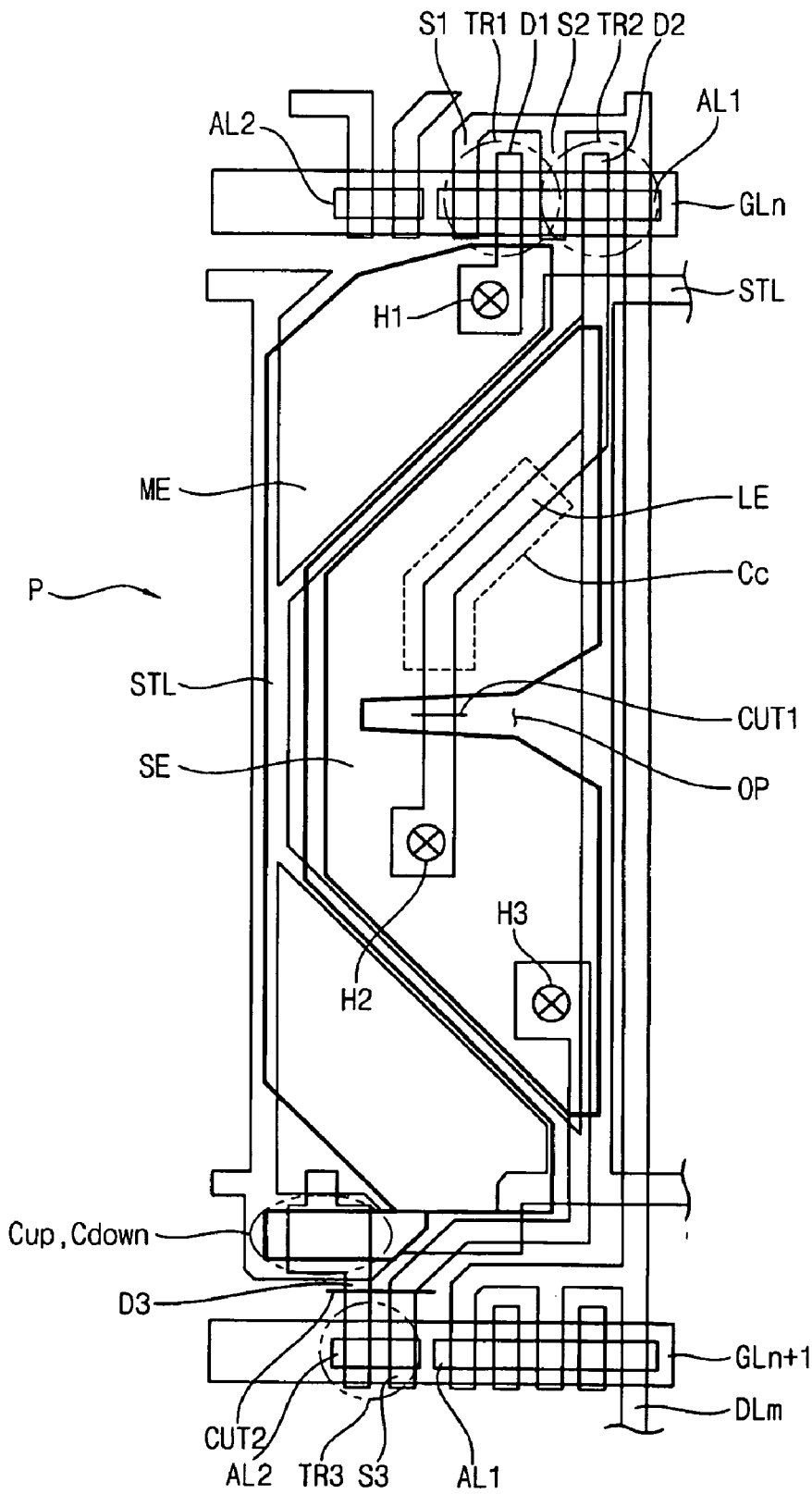
FIG. 4 is a plan view which illustrates a method of repairing a defective pixel of the display substrate according to the exemplary embodiment of the present invention in FIG. 1.
Figure 5:
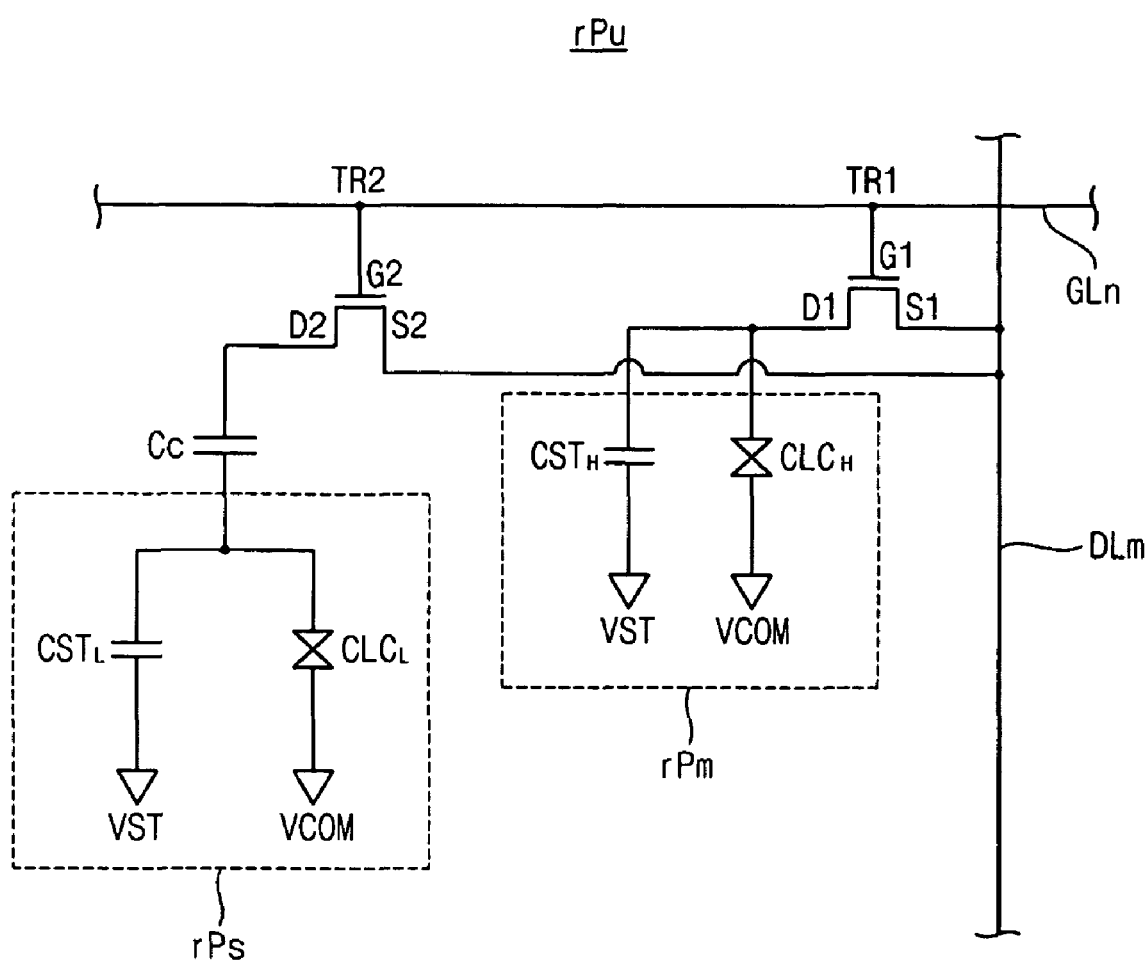
FIG. 5 is an equivalent schematic circuit diagram of a repaired pixel of the display substrate according to the exemplary embodiment of the present invention in FIG. 4.

FIG. 4 is a plan view which illustrates a method of repairing a defective pixel of the display substrate according to the exemplary embodiment of the present invention in FIG. 1. FIG. 5 is an equivalent schematic circuit diagram of a repaired pixel according to the exemplary embodiment of the present invention in FIG. 4.

Referring to FIG. 4, in a defective pixel a brightness of the sub-electrode SE may be greater than a brightness of the main electrode ME, for example. The defective pixel, in which the brightness of the sub-electrode SE is greater than that the brightness of the main electrode ME, may result from a defect of the up-capacitor Cup or a defect of the third switching device TR3 which drives the up-capacitor Cup, for example, but additional and/or other errors may also occur. For example, the defective pixel may occur due to an electrical short such as a short between the first terminal and the second terminal of the up-capacitor Cup, or a short circuit between the input terminal and the output terminal of the third switching device TR3, for example. Alternatively, a defective pixel may occur due to an absence of a channel pattern.

A method for repairing a defective pixel according to an exemplary embodiment of the present invention will now be described in further detail with reference to FIGS. 4 and 5. The same reference characters in FIGS. 4 and 5 refer to the same or like components in FIGS. 2 and 3, and any repetitive detailed description thereof will hereinafter be omitted.

As described in greater detail above with respect to FIGS. 1 and 2A, the extension electrode LE extends from the second drain electrode D2 of the second switching device TR2, and is exposed through the opening part OP of the sub-electrode SE. In an exemplary embodiment, a laser, for example is used to cut, e.g., disconnect, a portion of the extension electrode LE exposed by the opening part OP of the sub-electrode SE (hereinafter referred to as "CUT1"). As a result, the second switching device TR2 is electrically disconnected from the sub-electrode SE, and the sub-electrode SE and the extension electrode LE which overlaps the sub-electrode SE form a coupling capacitor Cc.

Next, the laser is used to disconnect, the third source electrode S3 and the third drain electrode D3 (hereinafter referred to as "CUT2"). Specifically, a connection line between the third source electrode S3 and the third contact part H3 is disconnected by the laser, and a connection line between the third drain electrode D3 and the main electrode ME is disconnected by the laser. When the third drain electrode D3 is electrically disconnected from the main electrode ME, the third drain electrode D3 is electrically disconnected from the first drain electrode D1 of the first switching device TR1, since the main electrode ME is electrically connected to the first drain electrode D1 of the first switching device TR1 via the first contact part H1, as described above in greater detail with reference to FIGS. 1 and 2A.

Accordingly, the third source electrode S3 is electrically disconnected from the sub-electrode SE which was previously connected to the third source electrode S3, and the third drain electrode D3 is electrically disconnected from the up-capacitor Cup which was previously connected to the third drain electrode D3.

Accordingly, the data voltage from the second switching device TR2 is transmitted to the sub-electrode SE via the coupling capacitor Cc. Therefore, the data voltage transmitted to the sub-electrode SE is less than the data voltage transmitted to the main electrode ME.

In an alternative exemplary embodiment, CUT 2 is performed before CUT 1 or, alternatively, the CUT 1 and CUT 2 may be performed simultaneously.

Still referring to FIGS. 4 and 5, a repaired unit pixel rPu includes a main pixel rPm and a sub pixel rPs. The repaired unit pixel rPu further includes a driving part (not shown) which drives the main pixel rPm and the sub pixel rPs.

The main pixel rPm includes a first liquid crystal capacitor $CLC_H$ and a first storage capacitor $CST_H$. The sub pixel rPs includes a second liquid crystal capacitor $CLC_L$ and a second storage capacitor $CST_L$. The driving part includes a first switching device TR1, a second switching device TR2, a third switching device TR3 and a coupling capacitor Cc.

A first gate electrode G1 of the first switching device TR1 is connected to an n-th gate line GLn, and a first source electrode S1 of the first switching device TR1 is connected to an m-th data line DLm. A first drain electrode D1 of the first switching device TR1 is connected to a first terminal of the first liquid crystal capacitor $CLC_H$. A first terminal of the first storage capacitor $CST_H$ is connected to the first terminal of the first liquid crystal capacitor $CLC_H$. A first common voltage VCOM is applied to a second terminal of the first liquid crystal capacitor $CLC_H$, and a second common voltage VST is applied to a second terminal of the first storage capacitor $CST_H$.

A second gate electrode G2 of the second switching device TR2 is connected to the n-th gate line GLn, and a second source electrode S2 of the second switching device TR2 is connected to the m-th data line DLm. A second drain electrode D2 of the second switching device TR2 is connected to a first terminal of the coupling capacitor Cc.

A second terminal of the coupling capacitor Cc is connected to a first terminal of the second liquid crystal capacitor $CLC_L$ and a first terminal of the second storage capacitor $CST_L$, respectively. The first common voltage VCOM is applied to a second terminal of the second liquid crystal capacitor $CLC_L$, and the second common voltage VST is applied to a second terminal of the second storage capacitor $CST_L$.

A driving method for driving the repaired unit pixel rPu will now be described in further detail with reference to FIG. 5.

When a gate signal is applied to the n-th gate line GLn, the first switching device TR1 and the second switching device TR2 are each turned on, and thus a data voltage (e.g., approximately 5 volts) is transmitted from the m-th data line DLm and is thereby applied to the first liquid crystal capacitor $CLC_H$ and the first storage capacitor $CST_H$. Accordingly, the data voltage is charged into the first liquid crystal capacitor $CLC_H$ and the first storage capacitor $CST_H$. In an exemplary embodiment, the first common voltage VCOM and the second common voltage VST are each approximately zero volts, but alternative exemplary embodiments are not limited thereto.

The coupling capacitor Cc connected to the second drain electrode D2 of the second switching device TR2 is charged to a predetermined voltage, based on to a capacitance thereof. In an exemplary embodiment, approximately 1 V is charged into the coupling capacitor Cc. Accordingly, the second liquid crystal capacitor $CLC_L$ and the second storage capacitor $CST_L$, which are each electrically connected to the coupling capacitor Cc, are charged by a voltage difference, e.g., a voltage difference of approximately 4 V between the data voltage (approximately 5 V) and the voltage charged into the coupling capacitor Cc (approximately 1 V).

Therefore, the data voltage charged in the sub pixel rPs is different from the data voltage charged in the main pixel rPm.

According to exemplary embodiments of the present invention as described herein, a unit pixel including a main pixel and a sub pixel has a structure including an extension electrode which extends from a switching device which drives a sub-electrode in the sub pixel and overlaps the sub-electrode. When a defect occurs in the sub pixel, the extension electrode and the sub-electrode operate as a coupling capacitor, and the repaired unit pixel operates normally, after a repair is made according a method for repairing the defective unit pixel.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A display substrate comprising:
    a pixel electrode comprising:
        a main electrode; and
        a sub-electrode disposed apart from the main electrode and including an opening part;
    a first switching device comprising:
        a first gate terminal connected to an n-th gate line (wherein "n" is a natural number);
        a first input terminal connected to a data line; and
        a first output terminal connected to the main electrode of the pixel electrode;
    a second switching device comprising:
        a second gate terminal connected to the n-th gate line;
        a second input terminal connected the data line; and
        a second output terminal; and
    an extension electrode which extends from the second output terminal of the second switching device and overlaps the opening part of the sub-electrode, the extension electrode being connected to the sub-electrode via a contact part.

2. The display substrate of claim 1, wherein the extension electrode overlaps the sub-electrode of the pixel electrode, and the contact part is formed at an end portion of the extension electrode.

3. The display substrate of claim 1, further comprising a third switching device including:
    a third gate terminal connected to an (n+1)-th gate line;
    a third input terminal connected to the sub-electrode of the pixel electrode; and
    a third output terminal connected to the first output terminal of the first switching device.

4. The display substrate of claim 3, further comprising an up-capacitor electrically connected to the first output terminal of the first switching device,
    wherein the main electrode of the pixel electrode and the third output terminal of the third switching device overlap to form the up-capacitor.

5. The display substrate of claim 4, further comprising a storage line that overlaps the main electrode and the sub-electrode.

6. The display substrate of claim 5, wherein the storage line overlaps each edge portion of the main electrode and the sub-electrode.

7. The display substrate of claim 5, further comprising a down-capacitor connected to the third output terminal of the third switching device,
    wherein the storage line and the third output terminal of the third switching device overlap to form the down-capacitor.

8. The display substrate of claim 1, wherein the first switching device and the second switching device comprise at least one common input terminal.

9. The display substrate of claim 1, wherein
    the sub-electrode has a trapezoidal shape having a base side and an upper side opposite to the base side, each substantially parallel to a first direction in which the n-th gate line is disposed, and
    the main electrode is disposed adjacent to oblique sides which connect the base side and the upper side of the sub-electrode.

10. A display substrate comprising:
a pixel electrode including a main electrode and a sub-electrode disposed apart from the main electrode and including an opening part;
a first switching device having a first output terminal being connected to the main electrode;
a second switching device having a second output terminal;
an extension electrode which extends from the second output terminal and overlaps the opening part and being connected to the sub-electrode via a contact part; and
a third switching device being connected to the sub-electrode and the first output terminal.

\* \* \* \* \*